Patented Mar. 26, 1946

2,397,333

UNITED STATES PATENT OFFICE 2,397,333

BROMINATION OF KETONES

Franz Bergel and Aaron Cohen, Welwyn Garden City, England, assignors to Roche Products Limited, Welwyn Garden City, England, a British company No Drawing. Application April 8, 1943, Serial No. 482,326. In Great Britain May 8, 1942

4 Claims. (Cl. 260—488)

Ketones of the type

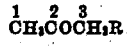

wherein R represents an alkyl, hydroxy alkyl, or an esterified hydroxy alkyl group, are known to be brominated, mainly in the three position, by means of free bromine. When sulphuryl chloride is used chlorination occurs, but if sulphuryl chloride is used in presence of alkali metal bromide, mainly the bromo compound is obtained, a process described in British Patent specification No. 550,197. Furthermore, in United States of America specification No. 2,223,885 the bromination of γ-acetopropyl acetate with sulphuryl bromide is mentioned. To our knowledge there is no alternative method of bromination of ketones of the above type published in the literature.

Though Rosenmund et al. (cf. Berichte der deutschen chemischen Gesellschaft, 1923, 56, p. 1262 and 2042) describe a new bromination agent in the form of organic bromo compounds, viz. dibromides of pyridine or quinoline salts, these have not been used for the smooth bromination of ketones of the above type.

The present invention provides a process which permits smooth bromination of ketones of the above type by reacting the dibromides of salts of organic bases such as pyridine or quinoline with the said ketones. The preparation of the bromination agents used in this invention follows in part the experiments of Rosenmund et al. (loc. cit.) but we have discovered that the same reagents can be prepared when salts of organic bases such as pyridine or quinoline are treated with chlorine in presence of the equivalent amount of alkali metal bromides. Thus bromination of the said ketones can be achieved by starting either with bromine and the salts of organic bases such as pyridine or quinoline or by starting with chlorine and the salts of organic bases such as pyridine or quinoline and alkali metal bromides.

The bromo-ketones thus produced are valuable intermediates in the preparation of thiazolium compounds (such as vitamin B₁). Bromination with the free halogen is an unpleasant and dangerous method when employed on an industrial scale, whereas the mild bromination herein described is free from such drawbacks and in comparison with other methods of bromination affords advantages in respect of smoothness of reaction and cleanliness of the reaction product.

The following examples in which the parts are by weight illustrate how the process of the invention may be carried into effect:

1. To 11.6 parts of pyridine hydrochloride dissolved in about 10 parts of glacial acetic acid 16 parts of bromine diluted with about 5 parts glacial acetic acid are added in portions and with cooling with ice water. The bromine is rapidly decolourised and towards the end of the procedure orange-coloured crystals separate. This mixture is slowly poured with shaking and cooling into 14.4 parts of γ-acetopropyl acetate, when a nearly colourless and homogeneous solution is obtained. Then about 30 parts of ether are added and the solution is poured into ice water. After separation of the ether layer and if necessary further additions of ether, the ether is several times well washed with small quantities of ice water. Finally the ether is treated with an ice-cold suspension in water of sodium bicarbonate until the ether layer is neutralised. After washing once more with ice-cold water, the ether is dried over sodium sulphate. The ether is evaporated and the residue is submitted to a fractionation in high vacuum. The fraction boiling between 95–105° C. at about 0.3–0.4 mm. contains 38% of bromine (theory 35.9%) and represents in the main γ-bromo-γ-acetopropyl acetate. This is shown by the fact that condensation with 2-methyl-4-amino-5-thioformyl-aminomethyl-pyrimidine yields aneurin.

2. To 8.27 parts of quinoline hydrochloride in 5 parts of glacial acetic acid 8 parts of bromine diluted with 2.5 parts of glacial acetic acid are added in the same way as described in Example 1. Then the mixture is poured with cooling into 7.2 parts of γ-aceto-propyl acetate. The solution is treated similarly to Example 1 and the residue distilled. Mainly γ-aceto-γ-bromoacetopropyl acetate is obtained. If desired the quinoline may be recovered from the ice-water washings.

3. 11.6 parts of pyridine hydrochloride in 20 parts of glacial acetic acid are stirred with cooling with 20.6 parts of anhydrous sodium bromide while a current of chlorine gas is passed through. When an increase of weight of about 7–7.5 parts has taken place the chlorine current is interrupted and the stirring continued for about 1 hour, at the end without cooling. The whole mixture is slowly poured into 14.4 parts of γ-acetopropyl acetate with shaking and cooling. About 30 parts of ether are added and the solution extracted in the same manner as described in Example 1.

After drying over sodium sulphate and after removal of the ether the residue is distilled when mainly γ-aceto-γ-bromopropyl acetate distils over at 95–105° C. at about 0.3 mm. This compound contains 34.8% of bromine and 1.4% of chlorine and forms aneurin with 2-methyl-4-amino-5-thioformylaminomethylpyrimidine.

4. To 7.2 parts of ethylmethylketone the reaction mixture of 11.6 parts of pyridine hydrochloride in 10 parts of glacial acetic acid and 16 parts of bromine in 5 parts of glacial acetic acid are added with moderate cooling. Ether is added and the ether solution is treated carefully with ice-water and sodium bicarbonate. After removal of the ether, the residue distils at 55° C. at 29 mms. This compound contains 53.9% of bromine (theory 53.0% and represents 3-bromoethylmethylketone). This is shown by the fact that condensation with thioacetamide yields trimethylthiazole, melting point of picrate 133–134° C. (cf. Beilstein Handbuch der Organischen Chemie, Vol. XXVII, p. 19—melting point 133° C.).

We claim:

1. A process for the manufacture of γ-bromo-γ-acetopropyl acetate which comprises reacting γ-acetopropyl acetate with a dibromide of a nitrogen containing heterocyclic base.

2. A process for the manufacture of γ-bromo-γ-acetopropyl acetate which comprises reacting γ-acetopropyl acetate with the dibromide of pyridine hydrochloride.

3. A process for the manufacture of γ-bromo-γ-acetopropyl acetate which comprises reacting γ-acetopropyl acetate with bromide and quinoline hydrochloride.

4. A process for the manufacture of γ-bromo-γ-acetopropyl acetate which comprises reacting γ-acetopropyl acetate with chlorine, pyridine hydrochloride and sodium bromide.

FRANZ BERGEL.
AARON COHEN.